United States Patent

Robinson et al.

[11] Patent Number: 6,132,620
[45] Date of Patent: Oct. 17, 2000

[54] METHOD AND APPARATUS FOR SEPARATING OIL AND WATER

[75] Inventors: Larry P. Robinson, 64 Brookedge Rd., Depew, N.Y. 14043; William J. Kennedy, Jr., Williamsville, N.Y.

[73] Assignees: Larry P. Robinson; Charlene B. Robinson, both of Depew, N.Y.

[21] Appl. No.: 09/110,934

[22] Filed: Jul. 6, 1998

[51] Int. Cl.⁷ .................................................... C02F 9/00
[52] U.S. Cl. .................. 210/669; 210/744; 210/799; 210/804; 210/124; 210/265
[58] Field of Search .................. 210/669, 799, 210/804, 86, 121, 265, 266, 416.1, DIG. 5, 242.3, 694, 744, 124

[56] References Cited

U.S. PATENT DOCUMENTS

| | | | |
|---|---|---|---|
| 3,727,765 | 4/1973 | Henning et al. | 210/242.3 |
| 4,137,169 | 1/1979 | El-Hindi | 210/416.1 |
| 5,225,073 | 7/1993 | Billiet et al. | 210/265 |

*Primary Examiner*—Ivars Cintins
*Attorney, Agent, or Firm*—Arthur S. Cookfair; James J. Ralabate

[57] ABSTRACT

Oil is separated from an aqueous mixture by first feeding the oil-water mixture into a separation tank and allowing the mixture to separate by gravity so that the oil rises to the surface, forming a layer above the aqueous phase; then removing the layer of oil from the surface. The lower aqueous phase, typically containing residual oil in emulsified form, is removed through an outlet near the bottom of the tank and transferred to a second tank, forming a pool therein. The water is removed from the second tank by the action of an air-operated pump through a float-controlled ball valve to an external filter for removal of residual oil.

19 Claims, 3 Drawing Sheets

METHOD AND APPARATUS FOR SEPARATING OIL AND WATER

BACKGROUND OF THE INVENTION

1. Field of the Invention

This invention is directed to an improved system for the separation of contaminants, such as oil, from mixtures of such contaminants with water.

2. Prior Art

In recent years, an increasing awareness of the importance of maintaining the quality of the environment has led to the development of various methods for separating contaminants, such as oil, from aqueous effluents before discharging the effluents to the environment. A common application for oil-water separation processes is in the treatment of condensates from compressed air systems. Air compressors are typically lubricated with oil and, in operation, some of the lubricating oil becomes admixed with the aqueous condensate. Acceptable disposal of such oil-water mixtures and/or recycling of the components requires that they be separated. The simplest and most common approach to such a separation relies on the limited miscibility of oil and water and the differences in their specific gravities. Oil-water separators are known, utilizing a holding tank or settling chamber wherein the mixture is allowed to settle and the oil, being of lower specific gravity, rises to the surface, where it may be conveniently skimmed or drained off. The use of such a system may be reasonably effective for the removal of free oil. However, many oil-water mixtures contain additional oil in the form of oil-water emulsions. Separation of oil present in the form of an emulsion is more difficult and may require the additional use of a filter or oil-adsorbing medium, such as activated carbon or a clay type material.

Filtration is often carried out as a final "clean-up" step to remove residual traces of emulsified oil after gravity separation of free oil. A problem frequently encountered with the use of such filters for oil removal is that they often become filled, or clogged, with oil in the initial contact region. The oil tends to fill in the crevasses and pores to the point where water cannot readily penetrate the filter media beyond the first point of contact. The force of gravity fed water is often not sufficient to overcome the resistance of the oil collected at that point with the result that the filter media must be replaced long before its useful life fits complete.

U.S. Pat. No. 5,143,611 to Pate discloses a system wherein oil and water are separated by gravity, first in a primary separation chamber and then in a secondary separation chamber, positioned within the primary separation chamber. An additional separation is provided by an external activated carbon filter.

U.S. Pat. No. 5,196,117 to Billiett et al discloses the separation of an oil-water mixture by first passing the mixture through a coalescing filter to coalesce oil present as an oil-water emulsion in the mixture, to form free oil droplets. Free oil is then separated by passing the mixture to a settlement chamber wherein free oil rises to the surface and is removed therefrom. The remaining traces of oil are then removed by passage through a sorbent bed.

U.S. Pat. No. 5,196,123 to Guthy discloses a method and apparatus for the separation of oil from an aqueous condensate. The process utilizes a separation tank interconnected with an oil receiver tank to effect a gravity separation of the oil and water with a subsequent treatment of the separated water by passage through activated carbon for the further removal of residual trace amounts of oil.

U.S. Pat. No. 5,225,073 to Billiett et al. discloses an apparatus for separating a contaminant, such as oil, from water wherein an oil-water mixture is passed through a coalescing filter where some oil is separated and the remaining liquid is passed to a settlement chamber where additional separation takes place. From the settlement chamber, the liquid is removed by a float-controlled pump and passed through a cross-flow filter and then an activated carbon filter.

U.S. Pat. No. 5,326,469 to Thompson discloses an oil and water separation apparatus wherein a gravity separation is followed by a further removal of oil by reaction with ozone.

Although the prior art methods and apparatus for the separation of oil and water have performed effectively for the separation of free oil, the removal of emulsified oil, for example, with the use of activated carbon has required careful monitoring and frequent replacement of the filter media.

Accordingly, it is an object of this invention to provide an improved method and apparatus for the separation of contaminants from aqueous mixtures and, in particular, the separation of oil from aqueous discharge condensates from compressed air systems.

It is a further object of the invention to provide an oil/water separation system having a more efficient method of filtration for the removal of emulsified oils and other residual contaminants.

It is a still further object to provide a compact and efficient apparatus for the removal of oil from aqueous mixtures.

SUMMARY OF THE INVENTION

In accordance with this invention, there is provided a method and apparatus wherein oil is separated from an aqueous mixture by directing the mixture to a first separation tank where the mixture is allowed to settle and separate by gravity so that free oil rises to form a layer on the surface. If the oil/water mixture is under pressure, for example, when the mixture is condensate from an air compression, it may be directed first to a diffuser chamber where gases are vented and the mixture is depressurized before it enters the first separation tank. In that separation tank, the surface layer of oil is then removed from the remaining aqueous phase; for example, through an opening in the wall of the tank. The oil removed may then be directed to an oil collection means for subsequent re-use or disposal. In a preferred embodiment, the opening through which the surface oil is removed is an adjustable-height opening which may be adapted to accommodate varying levels of surface oil.

The remaining aqueous phase is removed through a pipe or conduit having an inlet positioned near the bottom of the tank and an outlet at a level below the surface of the aqueous phase whereby the aqueous liquid may be drained by the action of gravity. From the outlet, the aqueous mixture may be directed to a second tank, forming a pool therein. The second tank serves as a reservoir for the remaining aqueous liquid. From this reservoir, the water is removed through a vertical pipe or conduit from a location near the bottom of the second tank by the action of an air-operated pump, through a float-controlled valve on the discharge side of the pump, to an external filter for removal of residual oil. As the level of liquid rises in the second tank, the float rises also and, in response, the valve opens wider permitting higher discharge flow rate and maintaining a suitable liquid level in the tank. The valve, in its full open mode, is sized to be capable of handling the full flow of the pump. Preferably the valve is a ball valve. As the aqueous mixture is discharged, the pump provides pressure to assist the continuing passage of the mixture through the external filter media and prevent or minimize the clogging of the filter in the initial contact region thereof.

Optionally, the second tank may be used for an additional gravity separation step and may be provided with a means for the removal of surface oil.

The use of an air-operated pump is particularly advantageous in that fire and electrical hazards are minimized. Furthermore, in the present system, the action of the pump is controlled without the need to turn the air on and off. Most air-operated pumps contain a shuttle valve. Turning the air on and off in order to start and stop the pump can cause the shuttle valve to stall if the air is turned off in the middle of a cycle. In the present system, the compressed air to the pump can be left on at all times since the outflow of the pump is controlled from the discharge side by means of the float-controlled valve. When the valve is closed, the pump will be unable to pump but air pressure to the pump will remain on. This shut-off system will not damage the pump, nor consume air, and will ensure that the shuttle valve does not stall.

In another embodiment, the apparatus of the present invention comprises a single tank wherein, after settling of the aqueous mixture, the surface layer of oil is removed through an automatic adjustable height outlet and the remaining aqueous liquid is removed, as described above, by the action of a pneumatically-operated pump, through a float-controlled valve to an external filter.

Various media, such as activated carbon, may be employed in the external filter. A particularly preferred media is a natural zeolite, such as clinoptilolite, in admixture with a minor portion of a quaternary ammonium salt, such as cetyl trimethyl ammonium chloride, commercially available as KF200/OMZ.

BRIEF DESCRIPTION OF THE DRAWINGS

The invention is further illustrated and explained in detail by reference to the accompanying drawings, wherein.

DETAILED DESCRIPTION

Figure 1:
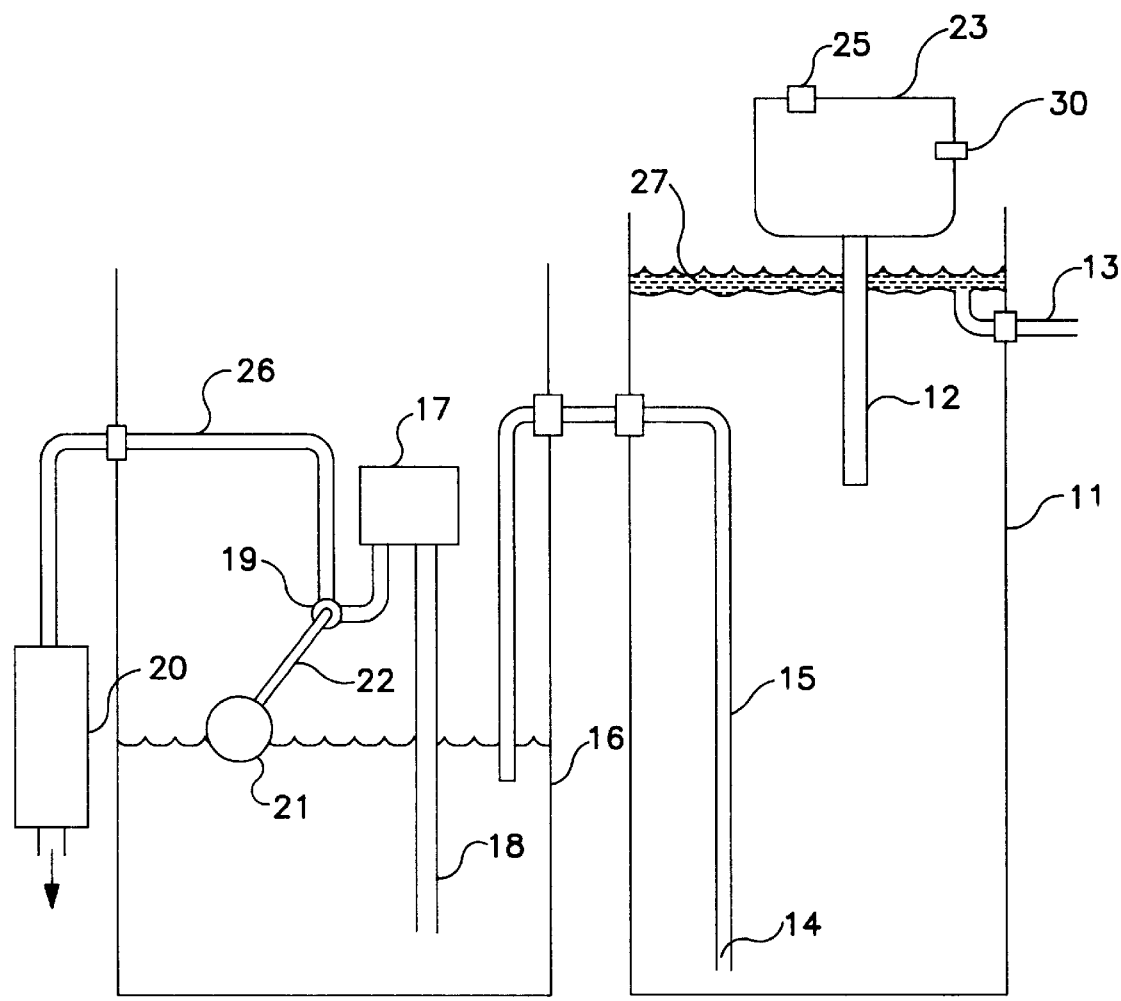
FIG. 1 is a side cross-sectional view of apparatus of the present invention.

With reference to the drawings in detail, in FIG. 1 there is shown an apparatus for the separation of oil from an aqueous mixture comprising a first gravity separation tank 11 having an inlet 12, for the entry of an oil/water mixture to be separated. In the embodiment depicted, inlet 12 receives the mixture from a diffuser chamber 23 where the mixture, under pressure, is received through condensate inlet 30, then depressurized and the gases vented through vent 25. The depressurization step and the use of a diffuser chamber is preferred when the oil/water mixture is a pressurized mixture, such as the condensate from an air compressor, but may not be necessary when other mixtures are to be treated. As the oil/water mixture settles in the tank, free oil in the mixture, because of its lower specific gravity, rises to the surface, forming a surface layer of oil 27 above the remaining aqueous phase. The surface layer of oil 27 is removed, for example, by draining off through an adjustable height oil outlet 13. The aqueous phase is removed through aqueous phase outlet 14 at the lower end of pick-up tube 15 and transferred therethrough, by gravity, to a second tank 16. From there the aqueous phase is allowed to settle and is removed through pick-up tube 18 by the action of a pneumatically-operated pump 17. From pump 17 the aqueous liquid is directed through float-controlled valve 19, and conduit 26, then to and through an external filter 20 where residual oil is removed.

Optionally, second tank 16 may be used to provide a second gravity separation if desired. For such use it is preferred to include in tank 16, a flexible conduit 34 supported by float means 32, as shown in FIG. 3, for the removal of surface oil.

Figure 2:
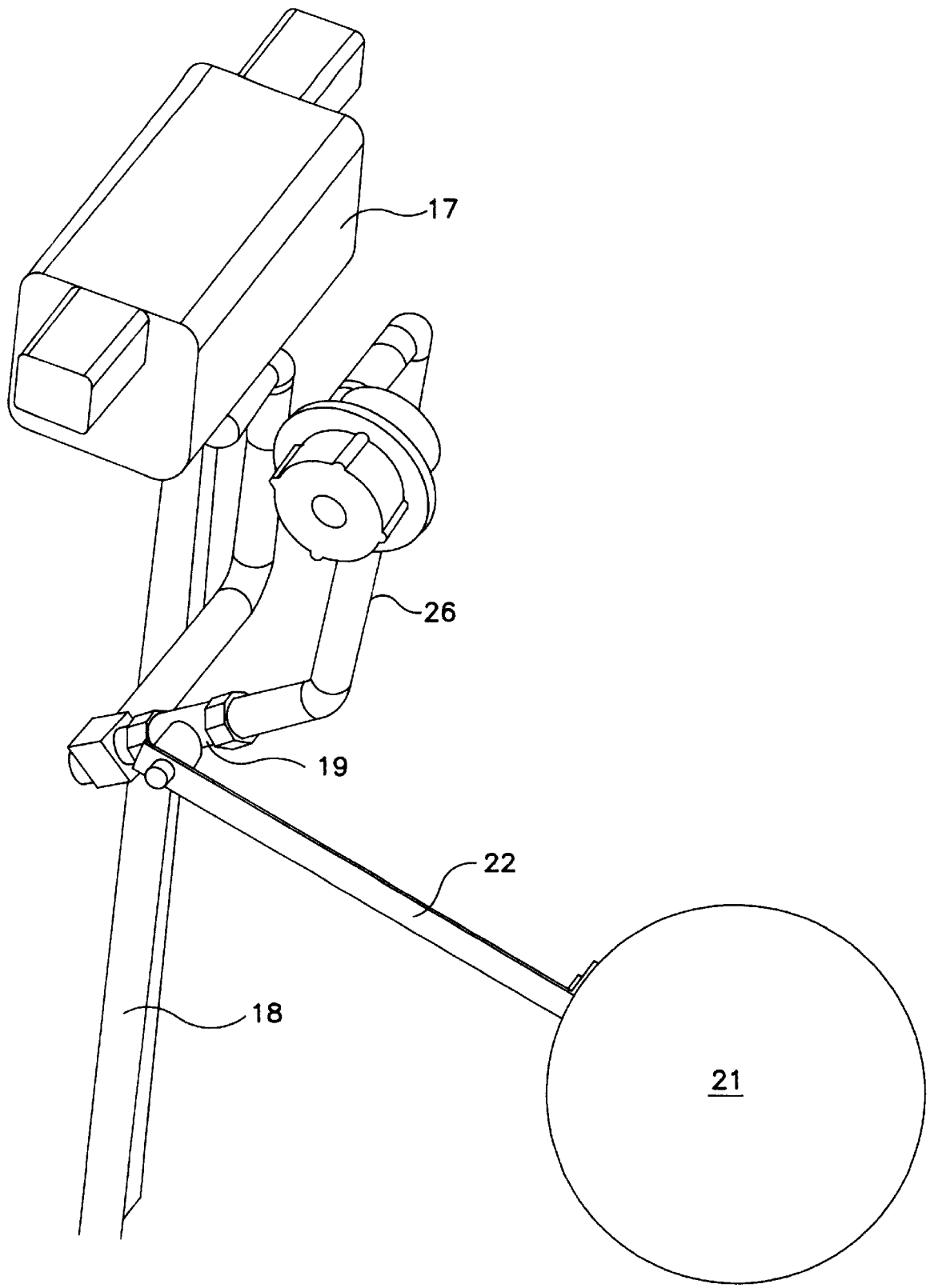
FIG. 2 is a detailed perspective view of an embodiment of the valve and float mechanism employed in the apparatus of the present invention.

As shown in greater detail in FIG. 2, valve 19, on the discharge side of pump 17 controls the flow from the pump to the external filter 20. The flow through valve 19, is responsive to the changing liquid level in tank 16, and the action of float 21 and lever arm 22. As the liquid level rises in the second tank 16, float 21 rises and the attached lever arm 22 opens valve 19 wider, permitting a greater rate of flow. Typically, in its fully open mode, the valve 19 is capable of handling the full flow from the pump 17. When the apparatus is operating, pressure from the pump 17 is continuous, even when the valve 19 is fully closed.

The pump 17 may be located within the tank or external to it. The pneumatically-operated pump employed in the apparatus of the present invention provides a distinct advantage, in that it may be safely situated within the tank, below the liquid level without the safety hazards that would be associated with an electric pump. Locating the pump within the tank makes it possible to provide a more compact unit.

Figure 3:
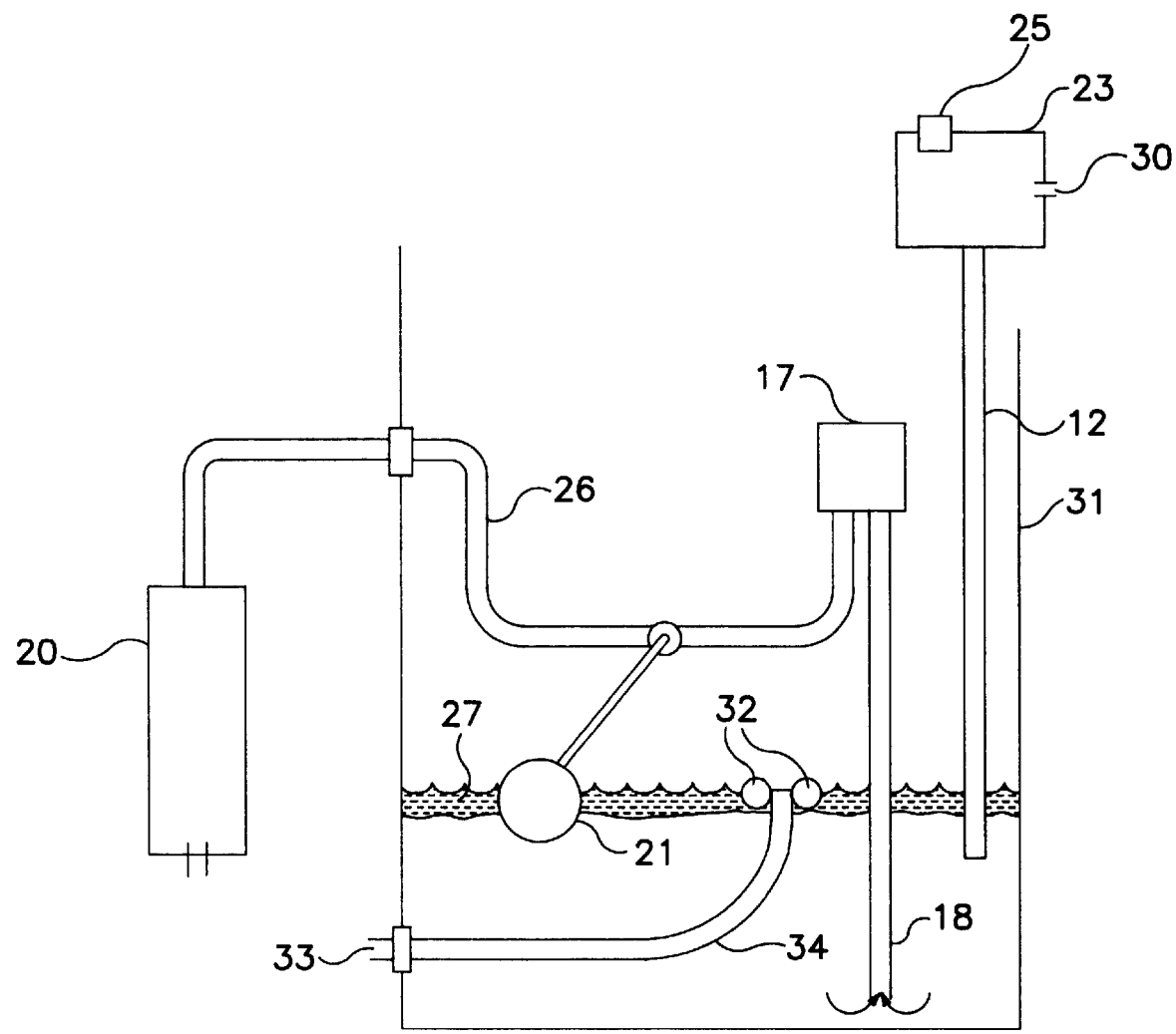
FIG. 3 is a side cross-sectional view of an embodiment of the invention utilizing a more compact single tank apparatus.

In another embodiment, as shown in FIG. 3, the apparatus of this invention may be constructed in an even more compact manner with the elimination of tank 16 and situating the pump and float and valve mechanism within tank 11. In the embodiment shown, surface oil is removed through conduit 34, such as a flexible tube or hose, and outlet 33 to an oil collection means (not shown). The flexible conduit 34 is supported at the surface level by float means 32. The latter may be in the form of pontoons, or other suitable shape, preferably of a material having a specific gravity such that it will float on the water layer rather than the oil layer to allow the oil to drain into the end of conduit 34 for removal.

While certain preferred embodiments of the present invention have been described herein and shown in the accompanying drawings, it will be understood that various modifications may be made without departing from the spirit and scope of the invention.

What is claimed is:

1. Apparatus for separating liquid contaminant from an aqueous mixture comprising:

a first tank for holding a pool of liquid; said first tank having an inlet for receiving liquid: a first outlet for removing liquid at the surface of said pool; and a second outlet for removing liquid from a lower region of said pool;

a second tank for holding a pool of liquid; said second tank having an inlet for receiving liquid from said second outlet of said first tank;

an external filter, separate from said first and second tanks, for the separation of contaminants from an aqueous mixture;

a pneumatically-operated pump for pumping liquid from a lower region of said second tank to and through said external filter means;

a liquid level control means for controlling the liquid level in said second tank and the flow rate of liquid pumped by said pump to said external filter.

2. Apparatus according to claim 1 wherein said liquid level control means comprises a valve through which discharge from said pump flows, said valve being controlled by an attached float, responsive to the level of liquid in said second tank.

3. Apparatus according to claim 2 wherein said external filter comprises activated carbon.

4. Apparatus according to claim 2 wherein said external filter comprises a zeolite for separating oil from water.

5. Apparatus according to claim 2 additionally comprising a diffuser chamber wherein an oil-containing aqueous mixture may be depressurized and introduced into said first tank inlet.

6. Apparatus for separating contaminants from an aqueous mixture said contaminants being of lower specific gravity than water comprising:

a tank for holding a pool of said aqueous mixture; said tank having an inlet for receiving said aqueous mixture; a first outlet for removing liquid at the surface of said pool; a second outlet for removing liquid from a lower region of said pool;

an external filter capable of separating said contaminants from an aqueous mixture;

a pneumatically-operated pump for pumping liquid from the lower region of said pool to and through said external filter;

a liquid level control means for controlling the liquid level in said tank and the flow rate of liquid pumped by said pump to said external filter;

said first outlet comprising a drain conduit for draining contaminants from the surface of said pool of aqueous mixture, said drain conduit having means for automatically adjusting to a varying surface level of said pool.

7. Apparatus according to claim 6 wherein said liquid level control means comprises a valve through which discharge from said pump flows, said valve being controlled by an attached float, responsive to the level of liquid in said tank.

8. Apparatus according to claim 7 wherein said drain conduit is a flexible conduit supported at one end by flotation means capable of floatation on the surface of said aqueous mixture.

9. Apparatus according to claim 8 wherein said external filter comprises activated carbon.

10. Apparatus according to claim 8 wherein said external filter comprises a zeolite for separating oil from water.

11. Apparatus according to claim 8 additionally comprising a diffuser chamber wherein an oil-containing aqueous mixture may be depressurized and introduced into said inlet.

12. A method of separating contaminants from an aqueous mixture, said contaminants being of lower specific gravity than water, comprising the steps of directing an aqueous mixture containing contaminants into a first tank and accumulating said mixture to a pre-determined level and allowing said contaminants to separate by gravity into an upper portion comprising a surface layer of contaminants and a lower portion comprising an aqueous phase;

removing said surface layer from the upper portion;

discharging said aqueous phase from the lower portion of said first tank to a second tank at a rate sufficient to maintain said pre-determined level in said first tank;

allowing said aqueous phase to form a pool in said second tank;

removing said aqueous phase from said second tank by pumping through a pneumatically-operated pump from a location adjacent the bottom of said second tank, through a variable control valve, to and through an external filter for further contaminant separation;

controlling the rate of removal by pumping said aqueous phase from said second tank through a variable control valve responsive to a float means, which, in turn, is responsive to the level of said aqueous phase.

13. A method according to claim 12 wherein said contaminant is oil.

14. A method according to claim 13 wherein said external filter comprises activated carbon.

15. A method according to claim 13 wherein said external filter comprises a zeolite for separating oil from water.

16. A method according to claim 13 wherein said aqueous mixture is depressurized prior to directing into said first tank.

17. A method of separating contaminants from an aqueous mixture, said contaminants being of a lower specific gravity than water, comprising the steps of directing a contaminant-containing aqueous mixture into a tank to form a pool therein and allowing said contaminants to separate by gravity forming a surface layer of contaminants above an aqueous phase;

removing said contaminants through a flexible outlet conduit supported at a receiving end thereof by a flotation means;

discharging said aqueous phase by pumping through a pneumatically-operated pump from a location in a lower portion of said pool, through a variable control valve, to and through an external filter for further contaminant removal;

said variable control valve being responsive to a float means, which in turn is responsive to the level of said pool.

18. A method according to claim 17 wherein said contaminant is oil.

19. A method according to claim 18 wherein an oil-containing aqueous mixture is depressurized prior to directing into said tank.

* * * * *